United States Patent [19]

Stengelin

[11] 4,251,370
[45] Feb. 17, 1981

[54] DEVICE FOR BIOLOGICAL DIGESTION OF SEWAGE

[76] Inventor: Volker Stengelin, Josef-Haydn-Str. 11, Tuttlingen, Fed. Rep. of Germany

[21] Appl. No.: 52,201

[22] Filed: Jun. 26, 1979

[30] Foreign Application Priority Data

Jun. 26, 1978 [DE] Fed. Rep. of Germany ....... 2827996

[51] Int. Cl.³ .............................................. C02F 3/08
[52] U.S. Cl. ................................. 210/150; 210/232
[58] Field of Search ....................... 210/2, 16, 17, 150, 210/151, 198 R, 218, 220, 232, 234; 404/122, 127, 131

[56] References Cited

U.S. PATENT DOCUMENTS

| | | | |
|---|---|---|---|
| 1,419,555 | 6/1922 | Garwood | 404/122 |
| 2,433,884 | 1/1948 | Bevan | 210/151 |
| 2,892,545 | 6/1959 | Griffith | 210/16 |
| 3,442,495 | 5/1969 | Schreiber | 210/151 |
| 3,534,857 | 10/1970 | Berk | 210/151 |
| 3,630,366 | 12/1971 | Joast | 210/150 |
| 3,817,857 | 6/1974 | Torpey | 210/17 |
| 4,010,102 | 3/1977 | Jarvstrat | 210/151 |
| 4,126,544 | 11/1978 | Baenseh | 210/16 |

FOREIGN PATENT DOCUMENTS

| | | | |
|---|---|---|---|
| 293 | 1/1979 | European Pat. Off. | 210/16 |
| 2710071 | 5/1978 | Fed. Rep. of Germany | 210/150 |

*Primary Examiner*—Ernest G. Therkorn
*Attorney, Agent, or Firm*—Craig & Antonelli

[57] ABSTRACT

A device for biological digestion of sewage utilizes rotationally symmetric rotatable growth surfaces, preferably plastic immersion percolating filters, which filters are immersed in the sewage as they rotate. The growth surfaces are mounted upon an immersion cylinder that is rotatably driven and mounted within a gas-tight container according to a preferred embodiment. The drive for the immersion cylinder includes a drive pinion having teeth which engage stud bolts connecting rings forming part of the immersion cylinder.

11 Claims, 4 Drawing Figures

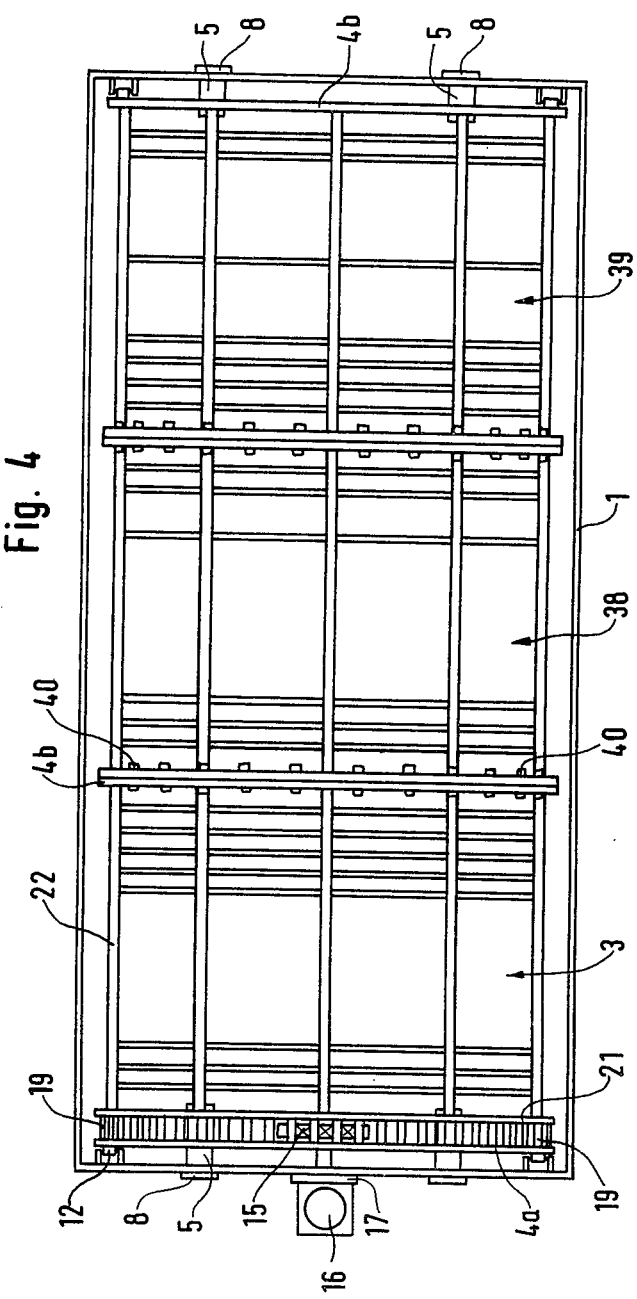

DEVICE FOR BIOLOGICAL DIGESTION OF SEWAGE

BACKGROUND AND SUMMARY OF THE INVENTION

The invention relates to a device for biological digestion of sewage with rotationally symmetric rotatable growth surfaces preferably made of plastic, namely so-called immersion percolating filters, which are immersed in the sewage as they are made to rotate by a drive.

In known digestion systems of this type, the immersion percolating filters used are approximately half-immersed in the sewage. The bacteria and micro-organisms required for digestion grow on their growth surfaces.

If the immersion percolating filter is used to decompose the organic carbon contained in the sewage, the micro-organisms on the growth surface, when they are dipped into the sewage, take in the organic carbon as "food" and take in the atmospheric oxygen for breathing when they surface.

According to the invention, ammonia nitrogen is to be converted into nitrate nitrogen, something which also requires oxygen. When the sewage is heavily contaminated with organic matter, it may be necessary for the growth surfaces of the immersion percolating filter to rotate not in a normal air atmosphere when they are outside the sewage but in an oxygen-nitrogen atmosphere containing for example over 60% oxygen. When sewage containing a great deal of ammonia is being oxidized, it may also be economical to increase the $O_2$ concentration. According to the invention, this method step is also carried out.

In addition, the object of the invention also makes it possible to carry out nitrification.

When the immersion percolating filter process is used for nitrification, the growth surfaces must pass through an oxygen-free atmosphere which contains, for example, fermentation gas or similar gases which can serve as electron donors.

The production of a special gas atmosphere is accordingly decisive for the efffectiveness of the biological digestion process in question.

Another decisive factor for the efficiency of the immersion percolating filter is the residence time in the tanks for a given growth area of the immersion percolating filter.

The biological processes for elimination of organic carbon, oxidation of the ammonia into nitrate, and denitrification of the nitrate into gaseous nitrogen require different residence times with a given growth surface area.

According to the invention, this problem can be solved with a device in which a gas-tight container is provided to eliminate organic carbon, oxidize ammonia into nitrate, and denitrify nitrate into gaseous nitrogen, in which container at least one immersion percolating filter cylinder having several immersion percolating filter plates adjacent to each other is mounted preferably above the maximum sewage level, is drivable, and has an adjustable height. The sewage level is adjusted according to the circumstances, namely according to the type and composition of the sewage to be digested. This container can be fed without difficulty at any time with different types of gases in succession.

The immersion percolating filter cylinder inside the container is also designed such that it has a supporting ring on one side and a drive ring on the other side, which rings are connected to each other by support rods distributed uniformly around the periphery, between which rods the growth surfaces are attached. In this way, the growth surfaces can consist of rigid plastic plates or plastic film. The latter must, of course, be suspended in a spring-tensioned manner. Because of this design, the growth surfaces preferably have a smaller diameter than the rings.

The drive ring consists of two sheet iron rings on edge, which rings are connected to each other by stud bolts and which hence are at a distance from each other such that a drive pinion mounted above the maximum sewage level causes the immersion percolating cylinder to rotate slowly when the pinion rotates because its teeth engage the stud bolts.

Immersion percolating filter cylinders of this type have no center shaft as do most of the previously known immersion percolating cylinders. The drive does not engage the center of the cylinder but its periphery. This facilitates driving. This is especially the case when the cylinder has been resting for a long time and the growth layer of the biological mat extending out of the water has dried thereby causing an imbalance. With the hitherto usual designs, the shafts or chain wheels frequently broke in such cases or the chains snapped.

The drive pinion advantageously engages the stud bolts at the apex of the drive ring and is located outside or inside the ring.

The outer rings of the immersion percolating filter cylinder each run on two flanged guide rollers located inside the rings and above the maximum sewage level. Because of the immersion percolating filter cylinder's own weight and the weight of the biological material growing on its growth surfaces, the rings of the cylinder fit closely about the flanged guide rollers so that the cylinder would be sufficiently reliably mounted by itself. To enhance the safety and for purposes of perfect lateral guidance of the immersion percolating filter cylinder, however, a third flanged guide roller could be mounted on the inner wall of the immersion percolating filter container.

All the rotating parts cooperating with the immersion percolating filter cylinder can be removed in the outward direction for easy disassembly for repair and maintenance work, and are screwed onto the container from the outside with a gas-tight flange. These rotating parts are the flanged guide rollers, the pivot bearings, and a drive motor to drive the pinion, and they are designed and arranged such that rotating parts can move only inside the container.

If any repairs become necessary, or when the immersion percolating filter cylinder is being removed from the tank, the roller bearings, the pinion, and the drive motor are removed. The immersion percolating filter cylinder is now resting on the drive and bearing ring on the bottom of the immersion percolating filter container without harming the growth surfaces.

Since the container must be closable in a gas-tight manner, if necessary, the inner space of the container above the sewage level can be made to communicate with the outside by means of sealing fluid in a syphon and via a pressure relief valve, which valve relieves the pressure when it exceeds about 500 mm water column.

In order to feed the optimally adapted type and quantity of gas into the gas space of the container for the digestion process being carried out, a gas pipe leads into the inner space of the container above the sewage level said pipe being fitted with a gas pressure adjustment valve.

The air leaving the immersion percolating filter container is sealed off by a pressure valve which consists of a U tube with a sealing liquid. This valve is set as required for a range of 20 to 500 mm water column.

The sewage flows in at a level slightly higher than the lowest sewage level expected, while the outlet pipe is connected with an outlet located slightly below the sewage inlet, which outlet can be at any level between the lowest and the highest of the expected sewage levels. The residence time can be optimally adapted to the requirements of the occasion by changing the sewage level.

It is also possible to enlarge the immersion percolating filter cylinder. For this purpose, at least one more immersion percolating filter cylinder is flanged to a supporting ring of an immersion percolating filter cylinder which cylinder has the drive ring on the other side, said second cylinder having only supporting rings. The thus enlarged cylinder is mounted in a larger container.

These and other objects, features and advantages of the present invention will become more apparent from the following description when taken in connection with the accompanying drawings, which show, for purposes of illustration only, plural embodiments in accordance with the present invention.

BRIEF DESCRIPTION OF THE DRAWINGS

FIG. 4 is a further embodiment with a wider container into which a larger immersion percolating filter cylinder is built, which cylinder consists of one drive immersion percolating filter cylinder and two flanged-on immersion percolating filter cylinders.

DETAILED DESCRIPTION OF THE PREFERRED EMBODIMENTS

Figure 1:
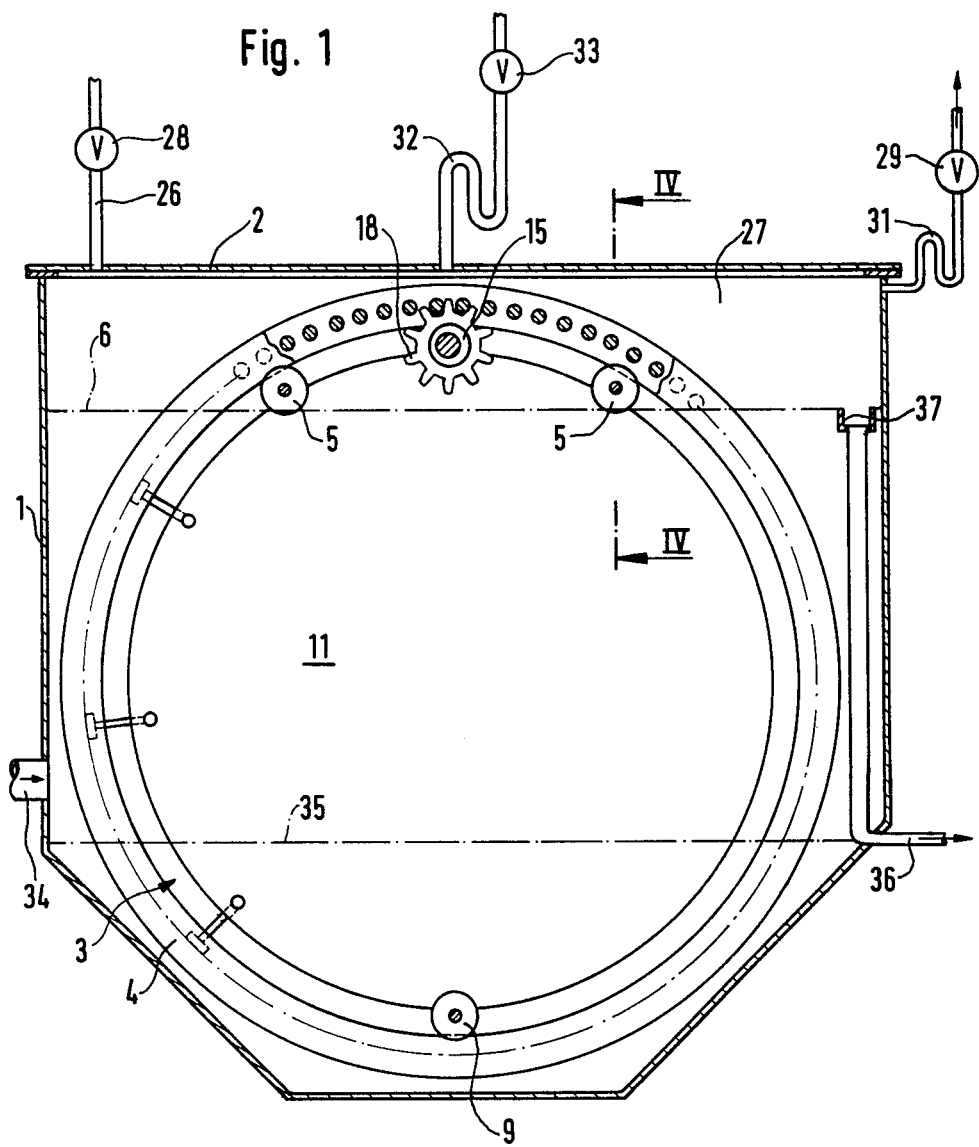
FIG. 1 is a vertical section through a gas-tight container according to the invention with an immersion percolating filter cylinder according to the invention located therein.
Figure 2:
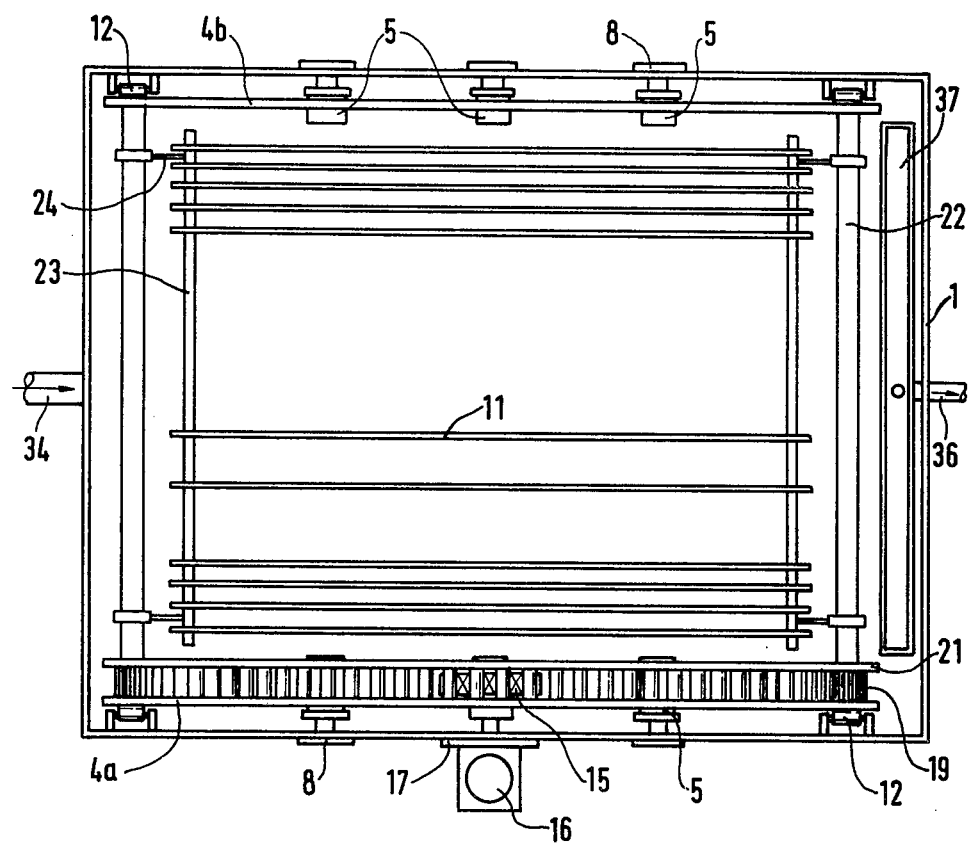
FIG. 2 is a top view of the container with its lid removed.
Figure 3:
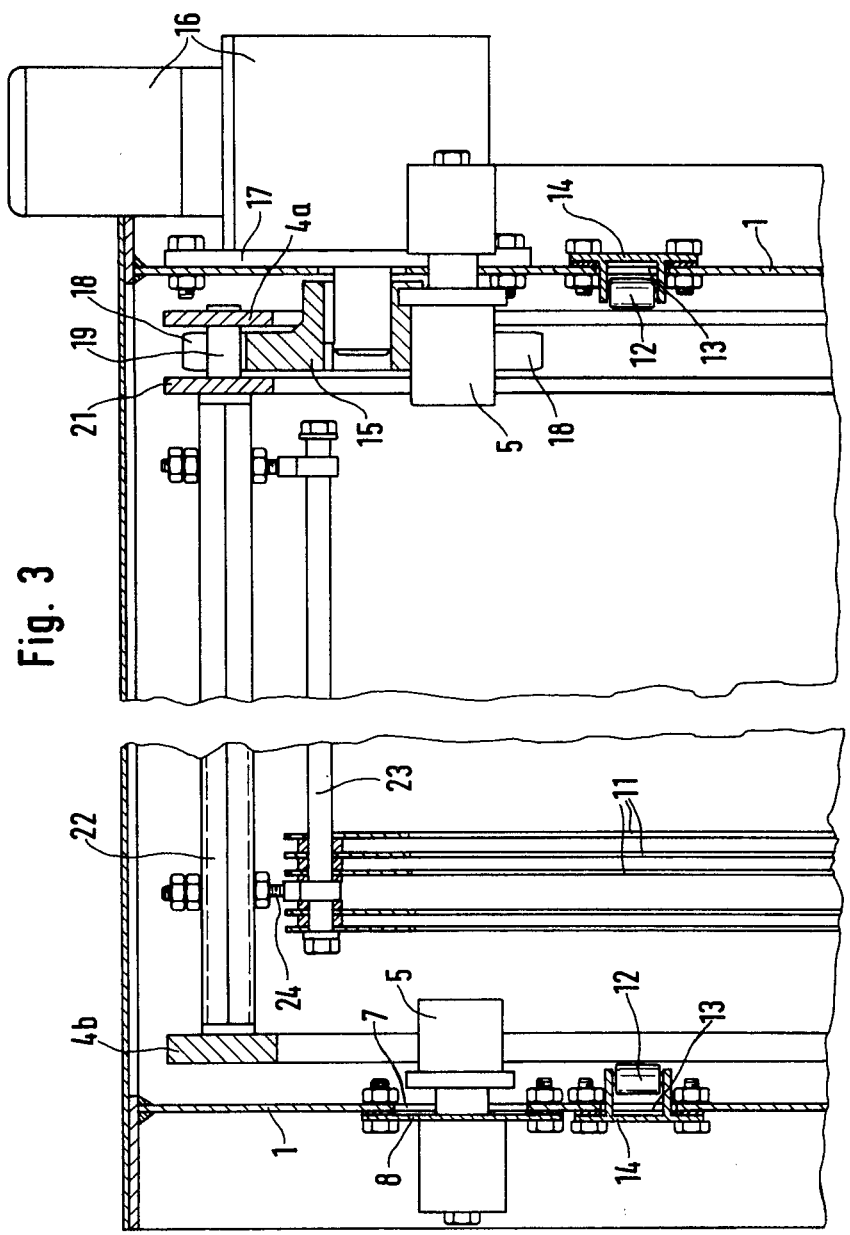
FIG. 3 is a section along line III—III in FIG. 1.

In the digestion system shown in FIGS. 1 to 3, an immersion percolating filter cylinder 3, in a gas-tight closable container 1 which is closed by a lid 2, is mounted with outer rings 4 on flanged guide rollers 5. Flanged guide rollers 5 are located above the maximum expected sewage level 6. They are made to protrude through an aperture 7 in the side walls of container 1 and bolted thereto with a flange 8 provided with a sealing ring between flange 8 and the side wall. The construction enables easy disassembly for repair and maintenance by detachment of the mounting bolts followed by axially outward withdrawal rotating parts.

In principle, it is sufficient to mount the immersion percolating filter cylinder on both flanged guide rollers 5 since it is made sufficiently secure by its own weight and the weight of the mat of biological material growing on it. To increase the safety of the mounting, a further flanged guide roller 9 can be advantageous and is particularly valuable when immersion percolating filter plates 11 made from a floatable plastic and having a specific gravity less than that of the sewage, are used. Moreover, for reliable guidance and to keep the guidance and alignment when the immersion percolating filter cylinder rotates, pivot bearings 12 are located to the side of outer rings 4, which pivot bearings roll along outer rings 4. These pivot bearings 12 are also mounted on the sidewalls of container 1 by being pushed through corresponding holes 13 from the outside and being bolted with flanges 14 to container 1 using appropriate seals.

The drive for a pinion 15, a drive motor 16 with a flange 17, is also attached to the sidewall of container 1 in a similar manner.

Pinion 15 engages a gear with its teeth 18, which gear is formed from stud bolts 19. Stud bolts 19 connect an outer ring 4a with corresponding ring 21 and maintain a uniform spacing between the two rings 4a and 21. These two rings 4a and 21, together with stud bolts 19 form the drive ring. The pinion 15 is preferably located at the apex of the drive ring and can be positioned inside (as shown) or outside of the ring.

Rings 4b and 21 are connected with each other by support rods 22 distributed evenly around their periphery. Between these support rods, the immersion percolating filter plates 11, which are connected to each other by crossbars 23, are suspended by adjustable and lockable connecting parts 24.

The structure of the immersion percolating filter cylinder and the drive with its bearing makes it possible easily to adjust the height of the sewage level in the immersion percolating filter container since there is no center shaft bearing and no drive from a center shaft. The sewage level in the immersion percolating filter container is adjusted by means of a height-adjustable gutter.

At the same time, immersion percolating filter container 1 can be closed in a gas-tight manner without sealing problems. Container 1 is closed with a lid 2 for this purpose. This lid is penetrated by a gas pipe 26 which exits into inner space 27 above the maximum sewage level 6 and is provided with a gas pressure adjustment valve 28. The type and amount of gas optimally adapted to the digestion process in question can be fed into the inner space 27 of container 1 through this pipe. Gas, for example fermentation gas or the like or oxygen, can be removed from inner space 27 via a pressure valve 29 connected beyond a siphon 31. This valve can be adjusted through a range of 20 to 500 mm water column as necessary.

In addition, inner space 27 communicates with the outside of the container via a siphon 32 (which is larger than siphon 31) and a pressure relief valve 33. This valve 33 responds at a pressure of 500 mm water column and permits release of pressure should pressure build up excessively despite withdrawal of gas via valve 29.

Sewage inlet 34 is located slightly above the lowest sewage level 35 that is expected. Outlet pipe 36 is located somewhat lower and is connected with a gutter 37 which can be positioned as desired between the lowest sewage level 35 and the highest 6.

It is also possible to enlarge the device according to the invention to process more sewage. For this purpose as shown in FIG. 4, two further immersion percolating filter cylinders 38 and 39 are flanged onto immersion percolating filter cylinder 3 at ring 4b of cylinder 3 with bolts 40. These additional cylinders 38 and 39 are provided only with rings which correspond to single ring 4b on immersion percolating filter cylinder 3. In this case also, the oppositely facing outer rings of immersion percolating filter cylinders 3 and 39 only serve as bearing rings.

It is noted that the term sewage in the foregoing description intends to cover not only organic sewage, but also sewage in the nature of industrial waste water.

While we have shown and described only plural embodiments in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

I claim:

1. A device for the biological digestion of sewage comprising:
   (a) a gas-tight container;
   (b) at least one rotationally symmetric immersion cylinder supported for rotation within the container,
   (c) a plurality of immersion growth surfaces mounted to said immersion cylinder; and
   (d) drive means for rotating said immersion cylinder, wherein said immersion cylinder comprises a supporting ring on one side and a drive ring on another side thereof, said rings being connected to each other by support rods distributed evenly around the periphery of the cylinder and between which rods the growth surfaces are attached, and wherein the drive means comprises a drive pinion mounted above a maximum sewage level, and the drive ring comprises two sheet iron rings on edge which are connected to each other by stud bolts and which are at a distance from each other such that the drive pinion causes the growth surfaces to rotate slowly when the pinion rotates by engagement of teeth on said pinion with the stud bolts, and further comprising two flanged guide rollers located inside outer rings of the immersion cylinder and above the maximum sewage level, said cylinder being supported on said rollers.

2. A device according to claim 1, wherein said growth surfaces are immersion percolating filter plates mounted to said cylinder in a positionally adjustable manner.

3. Device according to claim 1, wherein at least one further flanged guide roller is provided in internal contacting relationship with a lower range of the outer rings of the immersion cylinder.

4. Device according to claim 3, lateral alignment means for the immersion cylinder comprising pivot bearings located at sides of outer rings.

5. Device according to claim 4, characterized by the fact that the flanged guide rollers, the pivot bearings, and a drive motor connected to the drive pinion are mounted by a gas-tight flange upon the outside of the container so as to be removable for repair, maintenance or the like.

6. Device according to claims 1 or 5, comprising means for communicating an interior space within the container located above the sewage level with the outside via a sealing liquid and a pressure release valve for venting said space at an excess pressure of 500 mm water column.

7. Device according to claim 6, comprising a gas pipe fitted with a gas pressure adjusting valve leading into the interior space of the container located above the sewage level, through which pipe the type and quantity of gas optimally suited to a digestion process in question can be fed.

8. Device according to claim 6, comprising valve means for exhausting gas from the container through a range of about 2 to 500 mm.

9. Device according to claim 8, comprising a sewage inlet located slightly above a lowest anticipated sewage level.

10. Device according to claim 9, comprising an outlet pipe connected with a gutter and located slightly below the sewage inlet and which gutter is positionable at any level between the lowest sewage level and the highest level.

11. Device according to claim 1, comprising the immersion cylinder is flanged at the supporting ring, on a side opposite the drive means, onto at least one other immersion cylinder by bolts, said further cylinder having only supporting rings without a drive ring.

* * * * *